United States Patent [19]
Frehner et al.

[11] Patent Number: 5,644,289
[45] Date of Patent: Jul. 1, 1997

[54] COMPACT INSTRUMENT PANEL

[75] Inventors: Marc Frehner, Riehen; Clément Meyrat, Le Landeron; Daniel Donzé, Bienne, all of Switzerland

[73] Assignee: SMH Management Services AG, Biel, Switzerland

[21] Appl. No.: 423,296

[22] Filed: Apr. 18, 1995

[30] Foreign Application Priority Data

Apr. 19, 1994 [CH] Switzerland ................ 181/94

[51] Int. Cl.⁶ ........................................ B60Q 1/100
[52] U.S. Cl. ............................................. 340/461
[58] Field of Search ........................ 340/459, 441, 340/461, 462, 973; 345/4, 5, 30, 33, 34, 36, 38, 40, 184, 204

[56] References Cited

U.S. PATENT DOCUMENTS

| | | | |
|---|---|---|---|
| 2,340,403 | 2/1944 | Morley et al. | 73/51 |
| 3,110,882 | 11/1963 | Stuerzl et al. | 340/52 |
| 4,862,191 | 8/1989 | Siefert | 346/18 |
| 4,884,058 | 11/1989 | Ikeda | 340/461 |
| 4,954,807 | 9/1990 | Fleischer et al. | 340/459 |
| 5,578,985 | 11/1996 | Cremers et al. | 340/461 |

FOREIGN PATENT DOCUMENTS

| | | |
|---|---|---|
| 757811 | 1/1934 | France . |
| 1540562 | 2/1979 | United Kingdom . |

OTHER PUBLICATIONS

Patent Abstracts Of Japan, vol. 17, No. 539 (P-1621) Sep. 28, 1993 & JP-A-51 050 054 (Seiko Epson Corp).
Patent Abstract of Japan, vol. 4, No. 131 (P-027) Sep. 13, 1980 & JP-A-55 082 085 (Citizen Watch Co., Ltd.) Jun. 20, 1980.

*Primary Examiner*—Mark R. Powell
*Assistant Examiner*—Vincent E. Kovalick
*Attorney, Agent, or Firm*—Sughrue, Mion, Zinn, Macpeak & Seas

[57] ABSTRACT

A compact display device for a measuring or control instrument having on the same plate (4) a main dial (8) giving a main reading by means of a first needle (9) moving above secondary dials (8a, 8b, 8c) located inside the perimeter of the main dial (8), the needles of which (9a, 9b, 9c) rotate in a space included between the main dial (8) and the first needle (9) to give readings of different or complementary nature.

An instrument panel of a moving vehicle providing a main reading of speed on a circular dial.

7 Claims, 2 Drawing Sheets

COMPACT INSTRUMENT PANEL

FIELD OF THE INVENTION

The object of the instant invention is a compact analog display device for a measurement or control instrument in which a plurality of needles are superimposed on the same dial so as to permit the simultaneous reading of a main measurement and of other different or complementary measurements.

More particularly, the invention relates to an instrument panel for a vehicle which makes it possible to permanently provide a driver with the requisite information to ensure the correct operation of his vehicle, despite the reduced size of its display area.

DESCRIPTION OF THE PRIOR ART

The display on an instrument panel generally has a plurality of display dials, set out as a number of individual functional units, each unit being provided with its own display zone, its own motor and its own plate supporting the printed control circuit of the motor for the displacement of a needle across a scale, the various units then being juxtaposed, assembled and connected in the same housing. U.S. Pat. No. 4,954,807 gives an example of a conventional instrument panel of this type in which four displays carried by disks are juxtaposed. It will be noted that the disadvantage of a device of this type is that it is relatively bulky, having in particular a large display surface, even though certain dead angles between the display disks can be occupied by indicators or gauges. It will also be noted that a driver wishing to check, for example, his speed, at a glance could hesitate between two display dials of equal size. Devices of this type generally also have illumination means consisting of bulbs or diodes, located in front of the dial support for the indicators and behind the dial support, to illuminate the dial itself, which makes the area still more congested.

To reduce the surface taken up by instrument panels of this kind, various devices propose using a single display means, such as a needle, which moves across various scales, or across scales the value of interpretation of which can be modified using a selector button. Devices of this kind correspond, for example, to that described in U.S. Pat. No. 4,174,500 in which a single dial has a plurality of scales, only one of which is illuminated during selection of the measurement to be effected. A similar device is described in European patent 0 330 942 in which the recording scale of the needle is composed of a liquid crystal cell, which makes it possible to vary the readings carried by said scale by means of a button for selecting the measurement to be observed. Devices of this kind have the advantage of taking up less space, but still have the disadvantage that they either require the driver to manipulate a button or constitute a source of confusion for a driver paying only moderate attention to the meaning of the various scales.

OBJECTS OF THE INVENTION

It is an object of the instant invention to overcome these disadvantages by providing a compact instrument panel which nonetheless makes it possible for a driver to be simultaneously informed of a main reading, such as the speed of the vehicle, and of additional readings, such as the number of revolutions per minute of the engine, the fuel level, the state of charge of the batteries, the time, etc.

BRIEF SUMMARY OF THE INVENTION

For this purpose the instrument panel of the invention has a main dial, provided at its centre with a first needle moving across a scale located on all or part of the periphery, said main dial also comprising other smaller dials provided with needles adapted to rotate in the space provided between the first needle and the main dial. The first needle will therefore inform the user unmistakably and without need for special effort, of a main reading and, with slightly more attentive observation, of readings given by the position of the other needles moving across scales provided on the other dials.

The instrument panel of the invention can also have, in a manner known per se, luminous indicators, for example for the left and right indicators, the hand brake, the brake wear and tear, the main beam or dipped headlights, as well as the liquid crystal display cells, for example for a mile counter or for a trip indicator. To further reduce the thickness required, the illumination of the instrument panel of the invention is advantageously effected by means of an electroluminescent sheet having substantially the same surface as the dial, with the exception of the zones flush with the liquid crystal display cells, at the level of which the electroluminescent sheet is situated behind the cell. Similarly, the illumination of the indicators may, if desired, be effected by means of electroluminescent sheets, thereby reducing to the minimum the space provided between the dial and a sealing glass needed for the free rotation of the superposed needles.

Reduced thickness is also achieved by positioning and fixing the drive motors of the needles directly between a plate supporting the dial and a plate also serving to support the integrated management circuits for driving the motors.

BRIEF DESCRIPTION OF THE DRAWINGS

The invention will be better understood with reference to an embodiment shown in the appended drawings in which.

The figures show an instrument panel giving a main reading of speed, additional readings relating to the number of revolutions/minute of the engine, the fuel level and the time, these readings being completed by two liquid crystal cells to indicate respectively the total number of miles and the trip miles, and by indicators.

DETAILED DESCRIPTION OF THE INVENTION

Figure 1:
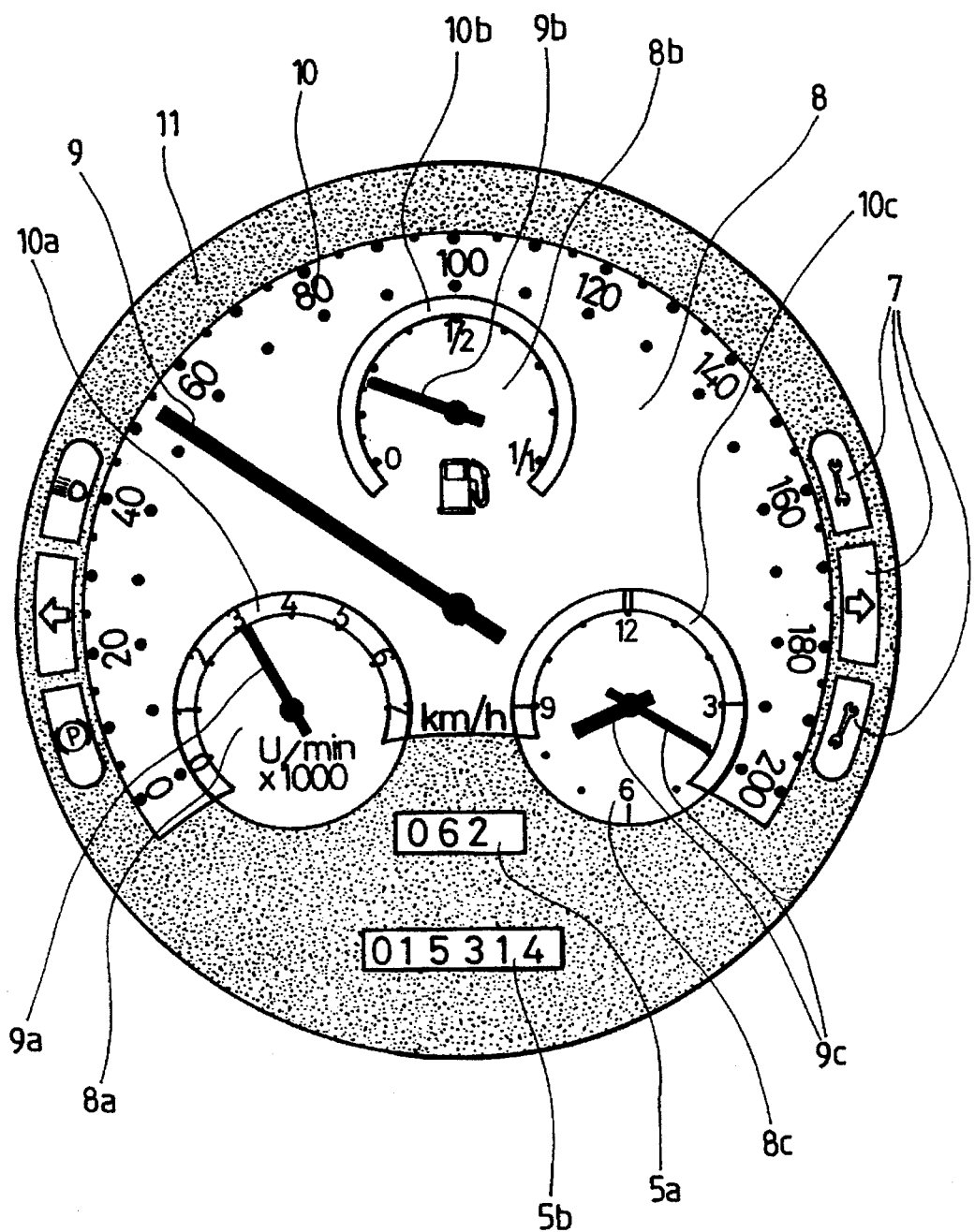
FIG. 1 is a front view of an instrument panel according to the invention.

Referring in particular to FIG. 1, this shows that the main reading is provided by a large needle 9, moving above a main circular dial 8, manufactured of transparent material and having close to its periphery a scale 10 graduated from 0 to 200 km/h. Printed on the main dial 8 are three other smaller secondary circular dials 8a, 8b and 8c, the graduated scales of which 10a, 10b and 10c give respectively readings regarding the number of revolutions/minute of the engine, the fuel level and the time, by means of needles 9a, 9b and 9c, said needles being disposed in a space between the plane in which the large needle 9 moves and the plane of the main dial 8. The front face of the instrument panel also has various indicators 7 distributed about the periphery and two liquid crystal display cells 5a and 5b in a zone not occupied by the small dials 8a, 8b and 8c.

Figure 2:
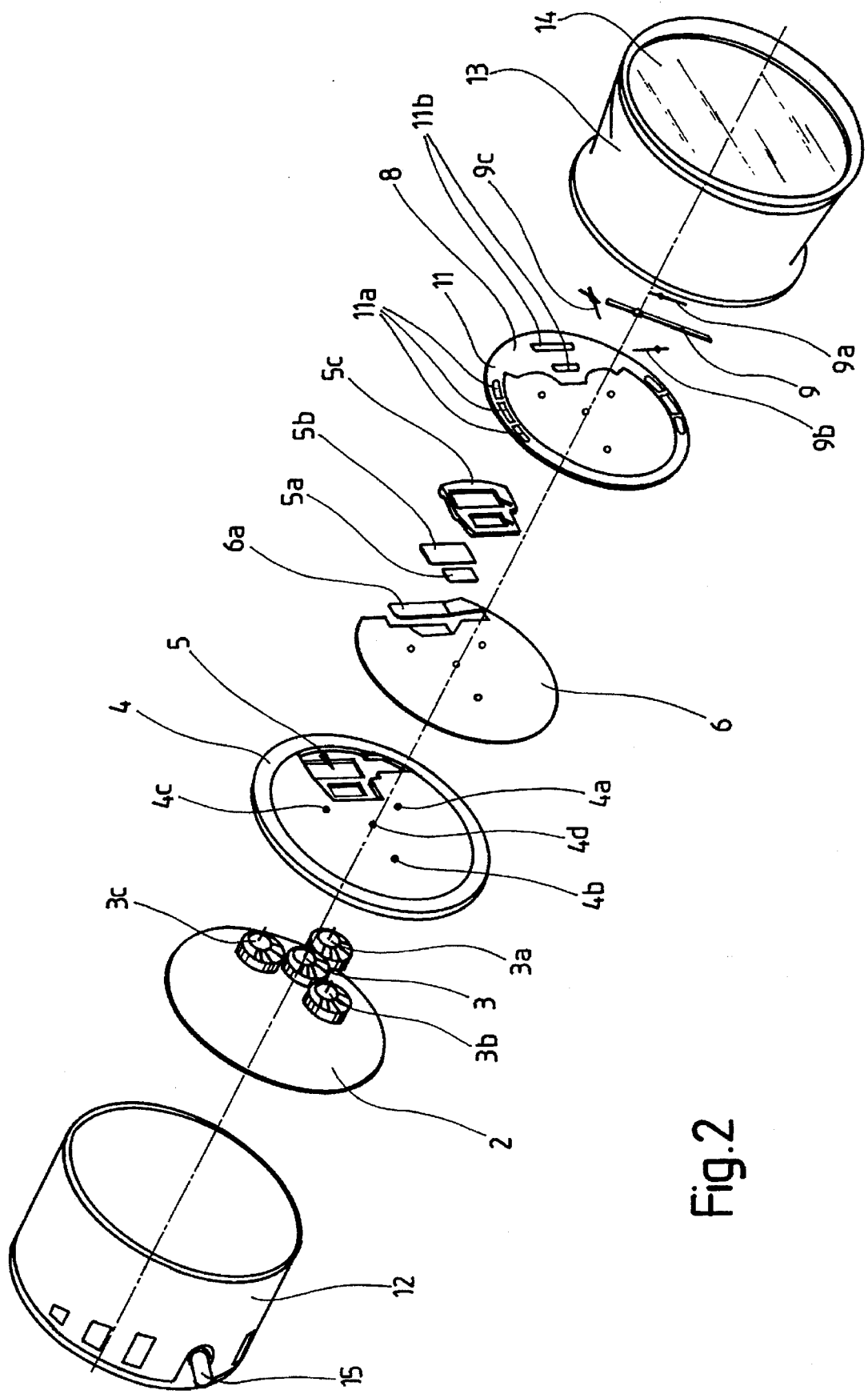
FIG. 2 is a diagrammatic exploded perspective view of the device of FIG. 1 without showing the mechanical assembly elements or the electrical connections.

As shown more clearly on the diagrammatic exploded view of FIG. 2, the needles of each of the dials are driven by small motors 3, 3a, 3b, 3c directly positioned and retained between a plate 2 and a plate 4 by means of holes 4a, 4b, 4c and 4d and of cross-pieces (not shown). The rear face of the plate 2, opposite that supporting the motors, has a printed circuit for managing the various displays.

The plate 4 also has an opening 5 adapted both to receive the two liquid crystal display cells 5a, 5b held in place by a cover 5c, and also to permit the passage of a tongue 6a of an electroluminescent sheet 6, said tongue being adapted to provide back illumination for said cells.

The electroluminescent sheet 6 is disposed between the plate 4 and the dial 8. The dial 8, made of transparent material, has also the readings more fully shown in FIG. 1. In particular it has an opaque circumference 11 with windows 11a provided therein for the indicators 7 and windows 11b for the cells 5a and 5b. Similarly, the indicators of the dial 8 can be carried by the electroluminescent sheet 6, the dial 8 then being reduced to the unlighted circumference 11 having the windows 11a and 11b.

The indicators 7 can be illuminated in a conventional manner by means of bulbs or diodes disposed in seatings provided for this purpose between the dial 8 and the plate 4. They may also, in their entirety or in part, be illuminated by discrete elements of the electroluminescent sheet 6, said elements then being individually connected to their own control circuits. These discrete elements can of course be made of electroluminescent materials having transmission wavelengths in the visible range that differ from those of the sheet taking up the major portion of the dial 8. The electroluminescent sheet 6 and the dial 8 also have holes aligned with the holes 4a, 4b, 4c and 4d for the passage of the shafts of the needles 9a, 9b, 9c and 9.

The various elements that have just been described are assembled mechanically and electrically using conventional means (not shown) and then retained in a housing 12 on which is positioned a ring 13 closed by a glass 14.

The housing 12 also has an adjustment button 15 which makes it possible, for example, to change the readings shown on the dial, such as the time on the panel clock 8c, or to zero the reading of the trip indicator 5a to return it to zero.

The device that has just been described, taking an instrument panel as an example, can be used in any type of industry. In the control room of a chemical production unit it would, for example, permit the simultaneous monitoring of the main parameter of a reaction, such as temperature and secondary parameters such as pressure and reaction rates.

Similarly, the device of the invention is not limited to the cylindrical shape that has just been described. Without departing from the scope of the invention, the housing could have a substantially oval, square or rectangular shape, assuming that a needle gives a main reading by being totally or partially superimposed on needles of other dials giving complementary readings, such needles being driven by small motors positioned and retained between the support of the dial and a plate also supporting the printed management circuit of the totality of displayed information.

We claim:

1. A compact analog display device for a measurement or control instrument having a plurality of individual dials, each provided with scales permitting the reading of different or complementary types of measurements by means of needles individually driven by separate motors, the operation of which is controlled by integrated circuits supported by a first plate, characterized in that a second plate supports both a main dial, providing a main reading in relation to a first scale by means of a first needle, and also a plurality of secondary dials, said first needle moving above said secondary dials, which are located inside the perimeter of the main dial, and which give readings, of a different or complementary type in relation to secondary scales, by means of different needles, the needles of said main and secondary dials being driven by said separate motors which are positioned and retained between said first and said second plates.

2. A compact display device according to claim 1, characterised in that an electroluminescent sheet (6) is interposed between the plate (4) and the first dial (8) to illuminate all the dials (8, 8a, 8b, 8c) of the device.

3. A display device according to claim 1, characterised in that it also has indicators (7) and liquid crystal display cells (5a, 5b).

4. An instrument panel for a moving vehicle composed of a device according to claim 1 in which the main dial (8) is circular and indicates the speed of the moving vehicle.

5. A compact display device according to claim 1, wherein said different needles rotate in a space between said main dial and said first needle.

6. A compact display device according to claim 1, wherein said main dial is larger than each of said secondary dials.

7. A compact display device according to claim 6, wherein said secondary dials are all of the same size.

* * * * *